United States Patent Office 3,408,352
Patented Oct. 29, 1968

3,408,352
2H-BENZO(b) QUINOLIZINES
Goetz E. Hardtmann, Florham Park, N.J., assignor to
Sandoz Inc., Hanover, N.J.
No Drawing. Continuation-in-part of application Ser. No.
365,498, May 6, 1964. This application Apr. 11, 1967,
Ser. No. 629,922
9 Claims. (Cl. 260—288)

ABSTRACT OF THE DISCLOSURE

The compounds are 1,3,4,6,11,11a-hexahydro-2H-benzo-(b) quinolizin-11-ones (A), 11-hydroxy-derivatives (B) of said 11-ones and intermediates (C) in the preparation of (A). (A) is prepared by condensing a pipecolic acid with, e.g., a benzyl halide and cyclizing the product (C) with polyphosphoric acid. (B) results from subjecting (A) to a Grignard reaction. Both (A) and (B) are useful as analgesics.

---

This is a continuation-in-part of application Serial No. 365,498 filed May 6, 1964, now abandoned.

The present invention is directed to compounds of the formula

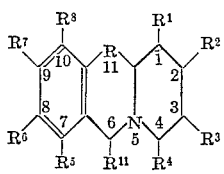

(I)

wherein
R is either carbonyl (>C=O) or

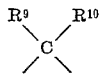

each of $R^1$, $R^2$, $R^3$ and $R^4$ is either carboxyl (—COOH); a hydrogen atom (—H); or straight chain lower alkyl, e.g. methyl, ethyl, propyl and butyl; at most two of $R^1$, $R^2$, $R^3$ and $R^4$ being other than a hydrogen atom; and $R^1$ and $R^2$ not being carboxyl in the same compound;
each of $R^5$ and $R^7$ is either lower alkoxy, e.g. methoxy, ethoxy, propoxy and butoxy; a hydrogen atom (—H); straight chain lower alkyl, e.g. methyl, ethyl, propyl and butyl; chloro (—Cl); bromo (—Br); trifluoromethyl (—CF₃); aryl, e.g. phenyl; primary amino (—NH₂); mono(lower)alkylamino; e.g. methylamino and butylamino; or di(lower)alkylamino, e.g. diethylamino;
$R^6$ is either a hydrogen atom (—H); lower alkyl, e.g. methyl, ethyl, propyl and butyl; chloro (—Cl); bromo (—Br); trifluoromethyl (—CF₃); carbocyclic aryl, e.g. phenyl; primary amino (—NH₂); mono(lower)alkyl-amino, e.g. methylamino and butylamino; or di(lower)alkylamino, e.g. diethylamino;
$R^8$ is either lower alkoxy, e.g. methoxy, ethoxy, propoxy and butoxy; a hydrogen atom (—H); straight chain lower alkyl, e.g. methyl, ethyl, propyl and butyl; chloro (—Cl); bromo (—Br); trifluoromethyl (—CF₃); primary amino (—NH₂); mono(lower)alkylamino; e.g. methylamino and butylamino; or di(lower)alkylamino, e.g. diethylamino; at most one of $R^5$, $R^6$, $R^7$ and $R^8$ being carbocyclic aryl, amino, halo, or trifluoromethyl;
$R^9$ is hydroxy (—OH); and
$R^{10}$ is either lower alkyl, e.g. methyl, ethyl, propyl and butyl; carbocyclic aryl, e.g. phenyl, naphthyl and diphenyl; cycloalkyl with from three to seven carbon atoms, e.g. cyclopentyl and cyclohexyl; 1-(lower)alkyl-4-piperidyl, e.g. 1-propyl-4-piperidyl; (lower)alkoxyphenyl, e.g. o-, m-, and p-methoxyphenyl; benzyl; —(CH₂)ₙ—CHR'—NH″R*, e.g. 1-dimethylamino-propyl-3- and 1-dimethylamino-1-methyl-propyl-3-; or

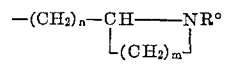

e.g. β-(2′-N-methylpiperidyl)-ethyl-;
R′ is either a hydrogen atom (—H); or lower alkyl, e.g. methyl, ethyl, propyl and butyl;
each of R″ and R* is, independently, either lower alkyl, e.g. methyl, ethyl, propyl and butyl; or cycloalkyl having from five to seven carbon atoms, e.g. cyclopentyl and cycloheptyl;
R° is lower alkyl, e.g. methyl, ethyl, propyl, isopropyl and butyl;
n is one of the integers, 1, 2 and 3;
m is one of the integers 3, 4 and 5; and
$R^{11}$ is either a hydrogen atom (—H); straight chain lower alkyl, e.g. methyl, ethyl, propyl, and butyl; phenyl or para-substituted phenyl, the substituent being either methoxy, trifluoromethyl (—CF₃), chloro (—Cl), fluoro (—F) or bromo (—Br); $R^{11}$ being p-methoxyphenyl only when at least two of $R^5$, $R^7$ and $R^8$ are methoxy; and being a hydrogen atom or lower alkyl when any of $R^5$, $R^6$, $R^7$ and $R^8$ is amino;

and to a process for preparing said compounds.
The process is a two-step reaction using readily available reactants. A piperidine-2-carboxylic acid of the formula

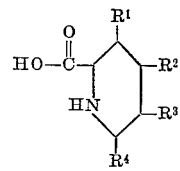

(II)

wherein each of $R^1$, $R^2$, $R^3$ and $R^4$ has the above-ascribed meaning, is reacted with a benzyl halide or ester of the formula

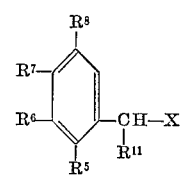

(III)

wherein
each of $R^5$, $R^6$, $R^7$, and $R^8$ and $R^{11}$ has the above-ascribed meaning, and
X is either chloro (—Cl), bromo (—Br), iodo (—I), tosylate or mesylate, at from 80° to 100° C. in an aqueous alkali-metal hydroxide, e.g. sodium hydroxide, medium to produce compound (IV):

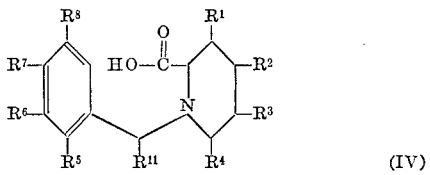

(IV)

wherein each of $R^1$ to $R^8$ and $R^{11}$ has the above-ascribed meaning. (The aqueous medium may, alternatively, be a water/dioxane medium containing alkali-metal hydroxide.) When any of $R^5$, $R^6$, $R^7$ and $R^8$ is a primary, secondary or tertiary amino group (only one such group being possible) in compound (I), the starting compound (III) contains a nitro group, i.e. at most one, in its stead. The nitro group is converted to the amino group after the reaction of compound (II) with compound (III) and according to well-known procedures.

Compounds (II) and (III) are either available or are prepared according to established procedures from known compounds.

To obtain compound (IV) from the first step of the two-step reaction, the amount of alkali-metal hydroxide in the medium is critical. There must be sufficient alkali-metal hydroxide to convert each carboxyl (—COOH) group of compound (II) to the corresponding alkali-metal salt group, e.g. (—COONa) and (—COOK), so as to avoid ester formation, but the concentration of alkali-metal hydroxide must be below that which would lead to saponification of compound (III) before it alkylates the nitrogen atom of compound (II). Since at most two of $R^1$ to $R^4$ can be carboxyl groups, the actual amount of alkali-metal hydroxide depends upon the actual number of such groups, i.e. in addition to the carboxyl group in the 2-position of compound (II). It is essential that each acid function (carboxyl group) be present in the form of its alkali-metal salt, and sufficient alkali-metal hydroxide must be present in the medium for this purpose.

The first step of the two-step reaction is thus accomplished by dissolving 1 mole of compound (II) in the aqueous solvent with an equivalent (for each carboxyl group) amount of alkali-metal hydroxide and thereafter adding, simultaneously and at reaction temperature, to the resulting solution 1 mole of compound (III) and an additional equivalent of alkali-metal hydroxide.

The second step of the two-step process is the cyclization of compound (IV) to produce compound (V):

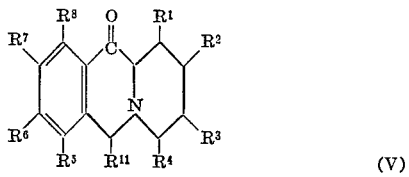

(V)

wherein each of $R^1$ to $R^8$ and $R^{11}$ has the above-ascribed meaning. Critical to this step is the use of polyphosphoric acid for ring closure. Other cyclization reagents, such as sulfuric acid and trifluoro-acetic anhydride, and cyclization of the acid chloride with stannous chloride are materially inferior and result in yields which are negligible compared to that obtained with polyphosphoric acid.

In addition to the preparation of compounds (V), this two-step process is also useful for producing compounds for formula (V) wherein each of $R^1$ to $R^5$, $R^7$, $R^8$ and $R^{11}$ have the above-ascribed meanings, and $R^6$ is lower alkoxy, e.g. methoxy, ethoxy, propoxy and butoxy.

Compound (V) is useful as an antidepressant, an analgesic, an analeptic and an anti-inflammatory. It can be administered to mammals either orally or parenterally in either a single daily dose or in divided doses from two to four times a day. Daily dosages are from 0.5 to 3 mg./kg. of body weight.

Each of the pharmaceutically active compounds of this invention, may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

| | Parts |
|---|---|
| Title compound of Example 2 | 40 |
| Tragacanth | 2 |
| Lactose | 49.5 |
| Corn starch | 5 |
| Talcum | 3 |
| Magnesium | 0.5 |
| Alcohol SD–30 } quantity sufficient. | |
| Purified water } | |

In addition compound (V) is useful as an intermediate in the preparation of compound (VI):

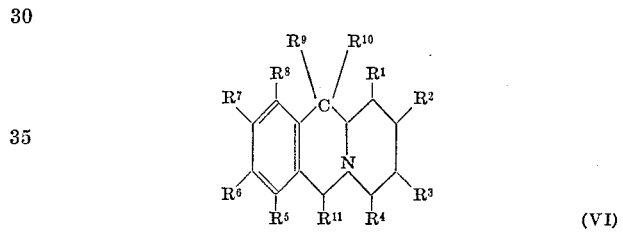

(VI)

wherein each of $R^1$ to $R^{11}$ has the above-ascribed meaning and wherein, in addition, $R^6$ is alternatively lower alkoxy, e.g. methoxy, ethoxy, propoxy and butoxy. ($R^{11}$ can be p-methoxyphenyl when $R^6$ is the only one of $R^5$ to $R^8$ which is methoxy.)

Compound (VI), which is useful for mammals as an antihypertensive and an analgesic in the same manner as compound (V), is prepared by reacting (standard Grignard Reaction) compound (V) with a Grignard Reagent, $R^{10}$—Mg—Y, wherein $R^{10}$ has the above-ascribed meaning, and Y is either chloro (—Cl), bromo (—Br) or iodo (—I). Alternatively, in place of $R^{10}$—Mg—Y, $R^{10}$—Li can be used to obtain similar results.

Therapeutically acceptable acid addition salts of both compound (V) and compound (VI) are similarly useful. Exemplary of such salts are salts of organic acids, e.g. tartaric acid; inorganic acids, e.g. hydrochloric acid, hydrobromic acid and sulfuric acid; monobasic acids, e.g. an alkylsulfonic acid, such as methanesulfonic acid ($H_3C$—$SO_3H$); dibasic acids, e.g. tartaric acid and succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as benzenesulfonic acid. The only limitation on the acid selected is that the resulting acid addition salt be pharmaceutically acceptable; the acid does not nullify the therapeutic properties.

The following examples illustrate the invention, the parts and percentages being by weight unless otherwise stated, and the relationship between parts by weight and parts by volume being the same as that between the kilogram and the liter. All temperatures are in degrees centigrade.

EXAMPLE 1

N-benzylpipecolic acid—The first step of the two-step process

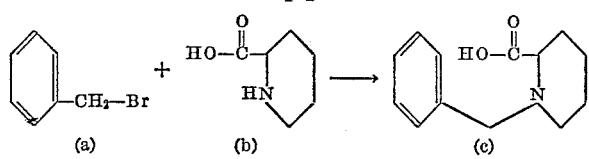

Dissolve in 100 parts by volume of water 25 parts of pipecolic acid (b) and 12.75 parts of potassium hydroxide (85% KOH). Heat the resulting solution to a temperature of 80°.

Concurrently add (from two dropping funnels) to the heated solution (while stirring same) over a period of thirty minutes 12.6 parts of potassium hydroxide (85% KOH) in 60 parts by volume of water and 24.1 parts by volume of α-bromotoluene (a). After the addition is completed, continue stirring the resulting reaction mixture for one hour at 80° before cooling same to room temperature (20°). There is thus obtained a slightly yellow solution.

Extract the slightly yellow solution twice with 50 parts by volume of diethylether to remove any benzyl ester which may have been formed. Thereafter add 2 N (normal) sulfuric acid to the slightly yellow solution to adjust its pH to 3. A precipitate is thus formed.

Filter off the precipitate (10.5 parts), and extract the filtrate 6 times with 50 parts by volume (each) of chloroform. Filter off precipitate formed during the extractions. Then dry the chloroform extract over sodium sulfate, and evaporate the solvent from the dried extract. Place the residue in a refrigerator at about 0°, where crystallization takes place slowly.

Add concentrated ammonia to the above-noted filtrate to adjust the pH thereof to 8. Evaporate the resultant to about 50 parts by volume, whereby a precipitate is formed. Filter the precipitate.

Combine all obtained precipitates and crystals, and extract (Soxhlet) the combination with chloroform for 48 hours. Thereafter evaporate the chloroform extract to dryness. There are thus obtained 30 parts of N-benzylpipecolic acid (c).

Recrystallize compound (c) twice from acetone to obtain very fine white crystals, melting point (M.P.) 223° to 228°.

In place of compound (a) α-chlorotoluene or α-iodotoluene is employed with comparable results. Likewise, under the same conditions as described fully hereinabove, every compound (II) is reacted with every compound (III) to produce every compound (IV), except: where any of $R^5$ to $R^8$ is a primary or secondary amino group, a nitro group is present in its stead during the reaction. The nitro group is subsequently reduced according to well-known procedures.

The only change in procedure occurs when one or two of $R^1$ to $R^4$ is a carboxyl group. For each of $R^1$ to $R^4$ which is a carboxyl group, an additional 12.75 parts of potassium hydroxide (85%) is dissolved in the aqueous solution in which compound (II) is initially dissolved.

Also the potassium hydroxide is replaced either wholly or partially by an equivalent amount of sodium hydroxide without otherwise altering the procedure or result.

Following the procedure of Example 1 (with the noted exception when one to two of $R^1$ to $R^4$ is a carboxyl group) react equivalents of each of the following compounds (II) and (III) to prepare the corresponding compound (IV):

| (II) | (III) | (IV) |
|---|---|---|
| Piperidine-2,3-dicarboxylic acid | 2-bromomethyldiphenyl | N-(o-phenylbenzyl)piperidine-2,3-dicarboxylic acid. |
| Pipecolic acid | 3-phenyl-2,4',5-trimethoxy-diphenyliodomethane. | N-[2,5-dimethoxy-3-phenyl-α-(p-methoxyphenyl)benzyl]pipecolic acid. |
| 2-pipecoline-4,6-dicarboxylic acid | α-bromotoluene | N-benzyl-2-pipecoline-4,6-dicarboxylic acid. |
| Piperidine-2,5-dicarboxylic acid | α-ethyl-3-nitro-4-phenyl-α-tosyl-toluene. | N-(α-ethyl-3-nitro-4-phenylbenzyl)-piperidine-2,5-dicarboxylic acid. |
| Piperidine-2,6-dicarboxylic acid | p-ethoxy-benzylmesylate | N-[4-ethoxybenzyl]piperidine-2,6-dicarboxylic acid. |
| Piperidine-2,3,5-tricarboxylic acid | 2-(1-chlorobutyl)-toluene | N-[α-propyl-2-methyl-benzyl]piperidine-2,3,5-tricarboxylic acid. |
| Pipecolic acid | 1-(1-bromopentyl)-3-ethyl-5-propoxybenzene. | N-[α-butyl-3-ethyl-5-propoxy-benzyl]pipecolic acid. |
| Do | 4-propyl-diphenyliodomethane | N-[2-phenyl-α-phenyl-4-propylbenzyl]pipecolic acid. |
| 5-ethylpipecolic acid | 5-butyl-2-ethoxy-4'-trifluoro-methyl benzhydryl tosylate. | N-[5-butyl-2-ethoxy-3-phenyl-α-(p-trifluoromethylphenyl)benzyl]-5-ethylpipecolic acid. |
| 4-propylpiperidine-2-carboxylic acid | α-(p-chlorophenyl)-α-mesyl-4-phenyl toluene. | N-[α-(p-chlorophenyl)-4-phenyl-benzyl]-4-propylpipecolic acid. |
| Piperidine-2-carboxylic acid | 2-chloro-4'-fluoro-4-propoxydi-phenylchloro-methane. | N-[2-chloro-α-fluorophenyl)-4-propoxybenzyl]pipecolic acid. |
| 3-butyl-piperidine-2-carboxylic acid | 3,4'-dibromo-2-propyl-diphenyl bromo-methane. | N-[3-bromo-α-(p-bromophenyl)-2-propylbenzyl]-3-butyl pipecolic acid. |
| Pipecolic acid | 4-fluoro-3-methoxydiphenyl-iodomethane. | N-(fluoro-5-methoxy-α-phenyl-benzyl)pipecolic acid. |
| Do | 4-methyl-α-tosyl-α-(p-trifluoro-methyl phenyl)toluene. | N-[4-methyl-α-(p-trifluoromethyl-phenyl)benzyl]pipecolic acid. |
| Do | α-mesyl-α-(p-methoxyphenyl)-2,4-dimethoxy-2-trifluoromethyl-toluene. | N-[2,4-dimethoxy-α-(p-methoxy-phenyl)-2-trifluoromethylbenzyl]-pipecolic acid. |
| Do | 4-chloro-3'-trifluoromethyl-diphenyl-chloromethane. | N-[α-(p-chlorophenyl)-3-trifluoro-methylbenzyl]pipecolic acid. |
| Do | 3-ethoxy-4-trifluoromethyl-benzylbromide. | N-[5-ethoxy-4-trifluoromethyl-benzyl]pipecolic acid. |
| 5-methylpipecolic acid | 4'-bromo-3-methyl-5-trifluoro-methyl diphenyl-bromo-methane. | N-[α-(p-bromophenyl)-3-methyl-5-trifluoromethylbenzyl]-5-methyl-pipecolic acid. |
| Pipecolic acid | 3-butyl-2-nitrobenzyltosylate | N-(3-butyl-2-nitrobenzyl)pipecolic acid. |
| 3-methylpipecolic acid | α,5-dimethyl-3-nitro-2-propoxy-benzylmesylate. | N-(α-5-dimethyl-3-nitro-2-propoxy-benzyl)-3-methylpipecolic acid. |
| Pipecolic acid | α-ethyl-4-nitrobenzyl chloride | N-(α-ethyl-4-nitrobenzyl)pipecolic acid. |
| 5-propyl-pipecolic acid | 2-methoxy-5-nitro-α-propylbenzyl bromide. | N-(2-methoxy-5-nitro-α-propyl-benzyl)-5-propylpipecolic acid. |
| Pipecolic acid | 2,5-dimethoxy-α-(p-methoxy-phenyl)-4-ethylbenzyl chloride. | N[4-ethyl-2,5-dimethoxy-α-(p-methoxyphenyl)benzyl]4-pipecolic acid. |
| 4-methylpipecolic acid | α-bromo-4-ethoxy-5-propyltoluene | N-(4-ethoxy-5-propylbenzyl)-4-methylpipecolic acid. |

EXAMPLE 2

1,3,4,6,11,11a-hexahydro-2H-benzo(b)quinolizin-11-one—The second step of the two-step process (c) $\xrightarrow{\text{PPA}}$ 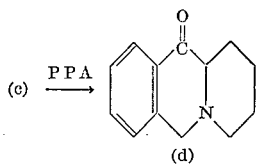 (d)

Maintain under stirring and at a temperature of from 145° to 150° 250 parts by volume of polyphosphoric acid (PPA). To the PPA under these conditions add (in 1-part portions) 10 parts of (c), uniformly admixing each part with the PPA prior to the addition of each successive part. After all of the (c) has been added, maintain the resulting reaction mixture at 150° under stirring for 30 minutes before cooling said reaction mixture to room temperature.

Pour the thus-cooled reaction mixture onto 500 parts of ice and neutralize (while maintaining the entire reaction mixture at below 0°, as with Dry Ice/methanol) with 50% (aq) potassium hydroxide solution.

Extract the neutralized solution five times with 300 parts by volume (each) of diethyl ether. Wash the combined ether extracts twice with 150 parts by volume (each) of water. Dry the washed extract over sodium sulfate, and evaporate the solvent in vacuo. There are thus produced 6.8 parts of light yellow oil which crystallizes on standing at room temperature.

Filter the crystals, wash same with 50 parts by volume of diethyether ether and sublime the thus-washed crystals at 65° in vacuo (0.1 mm.). 5.2 parts of white crystals M.P. 74° to 76°, are thus obtained. The yield is 52 percent based on the starting weight of (c).

In this example every compound (IV) produces results comparable with those illustrated. For example, each compound (IV) identified following Example 1 (any nitro group is converted to an amino substituent prior to ring closure) is subjected to ring closure in strict accord with the method of Example 2 with comparable results. To prepare a secondary or tertiary amino substituent, the primary amino group obtained by reducing a nitro substituent is appropriately alkylated prior to ring closure by standard procedures well known to the art-skilled.

EXAMPLE 3

1,3,4,6,11,11a-hexahydro-11-hydroxy - 11 - p - methoxyphenyl-2H-benzo(b)quinolizine—The use of compound (V) as an intermediate

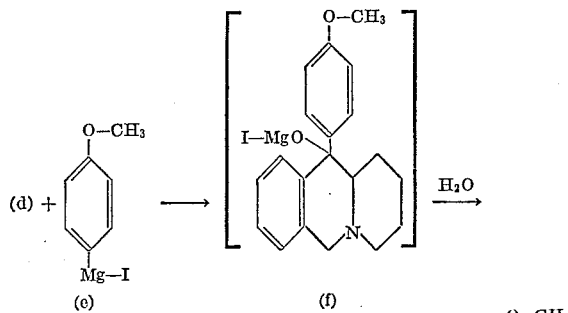

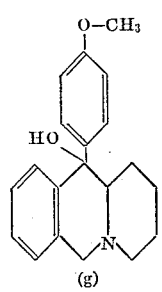

Bring 17.8 parts of p-iodoanisole into intimate contact with 1.7 parts of magnesium as in standard preparation for Grignard reagents, whereby p-methoxyphenyl magnesium iodide (e) is formed. Admix 15 parts of compound (d) dissolved in 50 parts by volume of diethyl ether with the thus-formed compound (e) at room temperature to form a reaction mixture.

Reflux the reaction mixture for thirty minutes, and then cool same to room temperature. Admix 100 parts by volume of concentrated (aq) ammonium chloride solution with the cooled reaction mixture. Separate the ether phase from the water phase in a separatory funnel.

Wash ether phase with water, and combine the wash-water with the water phase. Extract the combined water layers twice with 150 parts by volume (each) of chloroform. Combine the chloroform extracts, and wash same with water. Dry the washed chloroform extract over sodium sulfate, and combine with the ether phase.

Evaporate the combined chloroform and ether phases in vacuo to dryness to obtain 9 parts of grey-white crystals. Recrystallize said crystals twice from chloroform to obtain 6 parts of the title compound (g), M.P. 210.5° to 211.5°.

For the Grignard Reaction none of $R^1$, $R^2$, $R^3$ and $R^4$ is carboxyl.

In place of compound (e) each of the following Grignard reagents is employed with comparable results: methylmagnesium chloride, propyl magnesium bromide, phenyl magnesium iodide, cycloheptylmagnesium bromide, m-ethoxy phenylmagnesium iodide, benzylmagnesium chloride, 1-methyl-4-piperidylmagnesium chloride, 3-dimethylamino-1-propyl-magnesium chloride, 2-(N-methyl-2-piperidyl)ethyl magnesium chloride, 2-(N-cyclohexyl-N-methyl-amino)-ethyl magnesium chloride.

In addition, in place of the enumerated magnesium halides the corresponding organolithium compound, e.g. methyl lithium, is employed according to the procedure of Example 3 with comparable results.

In the same as described in detail in the procedural presentation of Example 3, the example is repeated with comparable results with each compound (V) produced according to Example 2. The product (VI) obtained depends only upon the specific reactants selected.

EXAMPLE 4

Methanesulfonate of 1,3,4,6,11,11a-hexahydro - 11 - hydroxy - 11 - p - methoxy - phenyl-2H-benzo(b)quinolizine—Acid-addition salt preparation

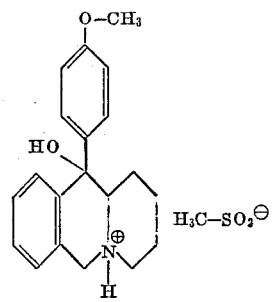

Dissolve 7 parts of (g) in 175 parts by volume of methylene chloride. Admix with the resulting solution 1.5 parts by volume of methanesulfonic acid. The color of the obtained solution turns yellow.

Heat the said obtained solution with 0.1 part of charcoal at 40° for 5 minutes. Filter off the charcoal. Evaporate the filtrate on a steam bath to about 50 parts by volume, whereupon the salt (title compound) starts to crystallize. Collect the crystals on a Buechner funnel and wash with diethyl ether. A yield of 6.5 parts is thus obtained.

Recrystallize from ethanol to obtain title compound having a melting point of 221° to 223°.

EXAMPLE 5

1,3,4,6,11,11a-hexahydro-11-hydroxy-11(γ-dimethylaminopropyl)-2H-benzo(b) quinolizine—The use of compound (V) as an intermediate

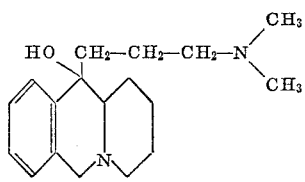

Admix 0.948 part of (d) in 10 parts of tetrahydrofuran with a solution of γ-dimethylaminopropyl-magnesium chloride (prepared from 0.55 part of magnesium and 2.85 parts of 3-chloro-N-dimethylpropylamine by standard procedures) in 10 parts of tetrahydrofuran. After the vigorous reaction which follows, reflux the reaction mixture for 10 minutes. Cool the resultant to room temperature (20°), and pour same into 50 parts of saturated (aq) ammonium chloride solution.

Extract the obtained mixture four times with 50 parts (each) of methylene chloride. Extract twice with 20 parts of water (each) the combined methylene chloride extracts. Dry the water-extracted methylene chloride extract over sodium sulfate, and evaporate the dried extract to dryness. Add 10 parts of diethylether to the residue to obtain 1.05 parts of white crystals, M.P. 113° to 114°, of the title compound.

It is thought that the invention and its advantages will be understood from the foregoing description. It is apparent that various changes may be made in the procedures, the intermediates and the final products without departing from the spirit and scope of the invention or sacrificing its material advantages. The processes, intermediates and final products hereinbefore described are merely illustrative embodiments of the invention.

What is claimed is:

1. A two-step process for the preparation of benzo-(b)quinolizin-11-ones which comprises: Ia. admixing in an aqueous alkali-metal hydroxide medium at a temperature from about 80 to about 100° C. piperidine-2-carboxylic acid of the formula

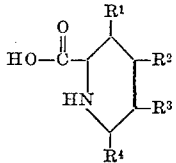

wherein each of $R^1$, $R^2$, $R^3$ and $R^4$ is a member selected from the group consisting of a hydrogen atom, straight chain lower alkyl and carboxyl; at least two of $R^1$, $R^2$, $R^3$ and $R^4$ being hydrogen atoms, and there being no more than one alkyl and one carboxyl substituent; in its alkali-metal salt form with a benzyl compound of the formula

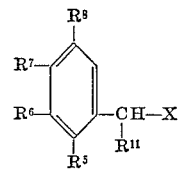

having at most one nitro-substituent and wherein each of $R^5$, $R^6$ and $R^7$ is a member selected from the group consisting of a hydrogen atom, straight chain lower alkyl, lower alkoxy, chloro, bromo, trifluoromethyl, nitro and $R^8$ is a member selected from the group consisting of a hydrogen atom, straight chain lower alkyl, lower alkoxy, chloro, bromo, and trifluoromethyl;

at most one of $R^5$, $R^6$, $R^7$ and $R^8$ being chloro, bromo or trifluoromethyl;

$R^{11}$ is a member selected from the group consisting of a hydrogen atom, straight chain lower alkyl, phenyl and para-substituted phenyl, the parasubstituent being a member selected from the group consisting of methoxy, trifluoromethyl, chloro, fluoro, and bromo; being p-methoxyphenyl only when at least two of $R^5$, $R^6$, and $R^7$ and $R^8$ are methoxy and being a hydrogen atom or lower alkyl when any of $R^5$, $R^6$, and $R^7$ is nitro; and X is a member selected from the group consisting of bromo, chloro, iodo, tosyl and mesyl;

for a period of from one half to three hours, the alkali-metal hydroxide medium containing one equivalent of alkali metal each equivalent of the benzyl compound, whereby an N-benzyl-pipecolic acid of the formula

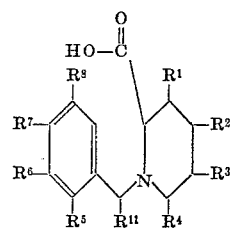

wherein each of $R^1$ to $R^8$ and $R^{11}$ has the above-ascribed meaning, is produced; Ib. reducing any nitro group to a primary amino group; and II. effecting ring closure of the N-benzyl-pipecolic acid with polyphosphoric acid as a cyclizing agent, whereby a benzo(b)quinolizin-11-one of the formula

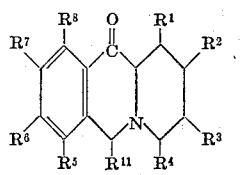

is produced, each of $R^1$ to $R^8$ and $R^{11}$ having the above-ascribed meaning except that any nitro group has been converted to amino.

2. The process of effecting ring closure which comprises crystallizing an N-benzyl-pipecolic acid with polyphosphoric acid as cyclizing agent.

3. A compound of the formula

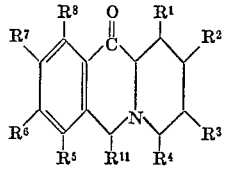

wherein
each of $R^1$, $R^2$, $R^3$ and $R^4$ is a member selected from the group consisting of a hydrogen atom, straight chain lower alkyl and carboxyl; at least two of $R^1$, $R^2$, $R^3$ and $R^4$ being hydrogen atoms; and there being no more than one alkyl and one carboxyl substituent;

each of $R^5$ and $R^7$ is a member selected from the group consisting of a hydrogen atom, straight chain lower alkyl, lower alkoxy, chloro, bromo, trifluoromethyl, primary amino, secondary lower alkylamino and di(lower)alkylamino;

$R^6$ is a member selected from the group consisting of a hydrogen atom, straight chain lower alkyl, chloro, bromo, trifluoromethyl, primary amino, secondary lower alkylamino and di(lower)alkylamino;

$R^8$ is a member selected from the group consisting of a hydrogen atom, straight chain lower alkyl, lower alkoxy, chloro, bromo, trifluoromethyl, primary amino, secondary lower alkylamino and di(lower)-alkylamino; at most one of $R^5$, $R^6$, $R^7$ and $R^8$ being lower alkoxy, amino, halo or trifluoromethyl; and $R^{11}$ is a member selected from the group consisting of a hydrogen atom, straight chain lower alkyl, phenyl and para-substituted phenyl the para-substituent being a member selected from the group consisting of methoxy, trifluoromethyl, chloro, fluoro and bromo; being p-methoxyphenyl only when at least two of $R^5$, $R^7$ and $R^8$ are methoxy, and being a hydrogen atom or lower alkyl when any of $R^5$, $R^6$, $R^7$ and $R^8$ is amino.

4. The compound according to claim 3 which is 1,3,4,6,11,11a-hexahydro-2H-benzo(b)quinolizin-11-one.

5. A compound of the formula

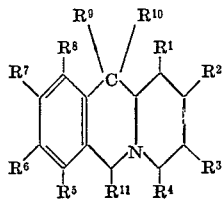

wherein each of $R^1$, $R^2$, $R^3$ and $R^4$ is a member selected from the group consisting of a hydrogen atom and straight chain lower alkyl; at least three of $R^1$, $R^2$, $R^3$ and $R^4$ being hydrogen atoms;

each of $R^5$, $R^6$ and $R^7$ is a member selected from the group consisting of a hydrogen atom, straight chain lower alkyl, lower alkoxy, chloro, bromo, trifluoromethyl, primary amino, mono (lower)alkylamino and di(lower)alkylamino;

$R^8$ is a member selected from the group consisting of a hydrogen atom, straight chain lower alkyl, lower alkoxy, chloro, bromo, trifluoromethyl, primary amino and di(lower)alkylamino; at most one of $R^5$, $R^6$, $R^7$ and $R^8$ being amino, chloro, bromo or trifluoromethyl;

$R^9$ is hydroxy;

$R^{10}$ is a member selected from the group consisting of lower alkyl, phenyl cycloalkyl having from three to seven carbon atoms, N-(lower alkyl)-4-piperidyl, (lower)-alkoxyphenyl, benzyl, and $$-(CH_2)_n-CHR'-NR''R^*$$

$R'$ is a member selected from the group consisting of a hydrogen atom and lower alkyl;

each of $R''$ and $R^*$ is, independently, a member selected from the group consisting of lower alkyl and cycloalkyl having from five to seven carbon atoms;

$n$ is a positive whole number of at most 3; and $R^{11}$ is a member selected from the group consisting of a hydrogen atom, straight chain lower alkyl, phenyl and para-substituted phenyl, the parasubstituent being a member selected from the group consisting of methoxy, trifluoromethyl, chloro, fluoro and bromo; being p-methoxyphenyl only when at least two of $R^5$, $R^6$, $R^7$ and $R^8$ are methoxy and being a hydrogen atom or lower alkyl when any of $R^5$, $R^6$, $R^7$ and $R^8$ is amino.

6. The compound according to claim 5 which is 1,3,4,6,11,11a - hexahydro - 11 - hydroxy - 11 - para - methoxyphenyl-2H-benzo(b)quinolizine.

7. The compound according to claim 5 which is 1,3,4,6,11,11a - hexahydro - 11 - hydroxy-11-(γ-dimethylaminopropyl)-2H-benzo(b)quinolizine.

8. The compound according to claim 5 which is 1,3,4,6,11,11a - hexahydro - 11 - hydroxy - 11 - methyl - benzo(b)quinolizine.

9. The compound according to claim 5 which is 1,3,4,6,11,11a - hexahydro - 11 - hydroxy - 11 - (N - methyl-4-piperidyl)-benzo(b)quinolizine.

References Cited

UNITED STATES PATENTS 3,124,581  3/1964  Bohler et al. _____ 260—279
3,346,581  10/1967 Gootjes et al. _____ 260—289 X

OTHER REFERENCES

Sugimoto: Pharm. Soc. Japan J., vol. 76, 1045–7 (1956).

Tani et al.: Pharm. Soc, Japan J., vol. 76, 1064–7 (1956).

NICHOLAS S. RIZZO, *Primary Examiner.*

ALTON D. ROLLINS, *Examiner.*

D. G. DAUS, *Assistant Examiner.*